United States Patent

Matheis

[11] Patent Number: 5,758,919
[45] Date of Patent: Jun. 2, 1998

[54] MOTOR VEHICLE

[75] Inventor: Anton Matheis, Bergisch Gladbach, Germany

[73] Assignee: Ford Global Technologies, Inc., Dearborn, Mich.

[21] Appl. No.: 736,836

[22] Filed: Oct. 28, 1996

[30] Foreign Application Priority Data

Oct. 27, 1995 [DE] Germany ............... 195 40 048.8

[51] Int. Cl.⁶ .................................................. B60R 5/04
[52] U.S. Cl. ................................. 296/37.16; 280/808
[58] Field of Search ............... 296/37.16; 280/801.1, 280/808

[56] References Cited

U.S. PATENT DOCUMENTS

| | | |
|---|---|---|
| 2,968,190 | 1/1961 | Orr . |
| 3,539,035 | 11/1970 | Wolkenstein . |
| 3,909,041 | 9/1975 | Murakami et al. ............ 280/808 |
| 3,994,513 | 11/1976 | Courtis et al. ............ 280/808 |
| 5,487,564 | 1/1996 | Fueller ............ 280/808 |
| 5,618,077 | 4/1997 | Ament et al. ............ 296/37.16 |

FOREIGN PATENT DOCUMENTS 2279863  1/1995  United Kingdom .

Primary Examiner—Joseph D. Pape
Attorney, Agent, or Firm—Daniel M. Stock

[57] ABSTRACT

A motor vehicle having fold-down backrests on rear seats has a cross-member which is releasably connectable to the backrests in their upper region and can be releasably attached by its end regions to devices for securing it in the direction of travel fitted on opposed regions of the inner body shell of the vehicle. The attachment of the end regions to the securing devices is effected by connecting the cross-member in a force-locking manner to the opposed regions of the inner body. Thus, through the cross-member, forces can be transmitted in known manner between the backrests and the inner body shell of the vehicle, and in addition a stiff transverse connection is obtained between the opposed regions of the inner body shell of the vehicle, which leads in the assembled state to a reduction of vibrations or of droning noises that may occur.

8 Claims, 2 Drawing Sheets

MOTOR VEHICLE

BACKGROUND OF THE INVENTION

1. Field of the Invention

The invention relates to a motor vehicle having fold-down backrests on rear seats and having a cross-member which is releasably connectable to the backrests in their upper region and can be releasably attached by its end regions to devices for securing it in the direction of travel fitted on opposed regions of the inner body shell of the vehicle.

2. Discussion of the Prior Art

Safety belts for persons seated on the rear seats of a motor vehicle can, for those persons seated on the outside, be attached to the inner body shell of the vehicle. However, if, for example, the rear seats are designed for three persons and the safety belt for the middle person is attached to the backrest for this person, it is necessary on safety grounds to support the backrest concerned against the inner body shell of the vehicle in such a way that the retaining forces of the seat belt are accepted by the inner side walls of the body.

For this purpose, a cross-member is known from United Kingdom specification 22 79 863 A, which on the one hand can be releasably secured in the upper region of the rear sides of the rear backrests, and on the other hand can be releasably attached by means of securing devices to opposed regions of the inner body shell. If the rear seat region is to be used as baggage space, the cross-member can be released, both from the backrests and from the securing devices engaging its ends, and removed. The backrests can then be folded down so that the space can be used as a baggage compartment. In this known device, the securing devices are formed so that the cross-member is located in position against the inner body shell of the motor vehicle in the direction of travel of the vehicle, i.e., transverse to the longitudinal direction of the cross-member.

SUMMARY OF THE INVENTION

It is an object of the invention to modify motor vehicles of the kind referred to above so that the function of the cross-member is extended and/or improved.

For this purpose, the invention provides that the end regions of the cross-member, when in its attached position, are connected to the opposed regions of the inner body shell through the securing devices in a force-locking manner. As a result of this, not only is the cross-member connected at its ends to the opposed regions of the body interior so that forces transverse to the longitudinal direction of the cross-member can be transmitted, but, in addition to this, a force-locking connection of the opposed regions of the inner body shell of the vehicle is obtained via the cross-member. This leads to better vibration and noise behavior of the vehicle body. Especially in the case of so-called dual-purpose vehicles, such as station wagons, the body constitutes a relatively large interior space, open to the rear, which in the region between the vicinity of the backrests of the front seats and the rear door of the vehicle, is formed by the floor unit, the roof, and the side walls, with an inadequate connection between them. This leads basically to the risk that oscillations and vibrations may occur which can lead to droning noises when the vehicle is being driven.

According to the invention, the cross-member is used, in addition to its original function, to stabilise the interior space of the vehicle and thus to increase the stiffness of the body shell and reduce the susceptibility of the body to vibration. This advantageous effect is obtained when the cross-member is in the installed position, i.e., when the vehicle is being used primarily for the transport of passengers and not of bulky loads.

According to a further aspect of the invention, the securing devices can be in the form of clamping devices with mutually conically converging seating regions to receive the end regions of the cross-member. The end regions of the cross-member are provided with corresponding mutually conically converging bearing regions.

It is particularly advantageous if the seating regions and the bearing regions are formed as mutually conically converging seating faces.

According to a further aspect of the invention, one of the seating faces of each of the securing devices may be formed so that when viewed upwardly from below, it is inclined obliquely counter to the direction of travel. This has the advantage that even in the event of improper functioning of the securing device, the cross-member remains in position and reliable anchoring of the backrests to the cross-member is still ensured.

The clamping devices can, for example, be in the form of toggle clamps. Alternatively, the clamping devices can comprise clamping levers and detent pawls.

According to a further aspect of the invention, the cross-member may be formed, at least in its section intermediate the end regions, as a hollow-section body having a continuous longitudinal slit. In the case of a motor vehicle of the hatchback type, the longitudinal slit can be used to locate a fold-down hat shelf. In the case of a station wagon, the hollow-section body can be used to receive a shaft for winding up a baggage compartment blind, the free end of which is led outwards through the longitudinal slit in the hollow profile body.

According to a further embodiment of the invention, the end regions of the cross-member can be formed as end-pieces fitted on the ends of the hollow-section body, which are provided with the mutually conically converging bearing faces and with bearings for the winding shaft.

The attachment of the securing devices can be effected on brackets which are arranged between the rear wheel well and the C-pillar structure of the vehicle.

BRIEF DESCRIPTION OF THE DRAWINGS

The invention will now be described in more detail with reference to the exemplary embodiments illustrated in the accompanying drawings, in which.

DETAILED DESCRIPTION OF PREFERRED EMBODIMENTS

A motor vehicle in the form of a so-called station wagon includes a divided fold-down backrest 1 on the rear seats 2.

Figure 1:
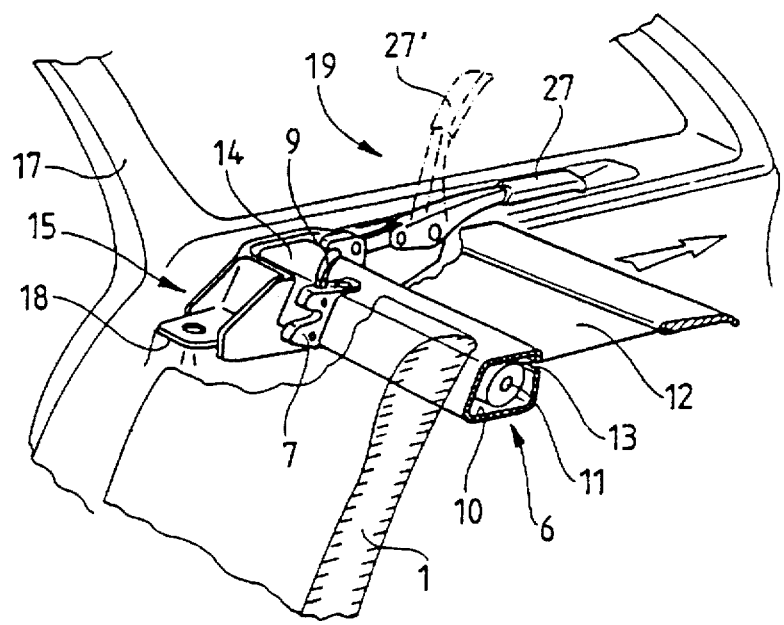
FIG. 1 is a diagrammatic perspective view of a section of a rear seat backrest and a section of a cross-member which can be connected releasably to the backrest and also, by its end region facing the inner body shell of the vehicle, be connected in a force-locking manner to an inner wall region of the body by way of a securing device in the form of a clamping device.
Figure 2:
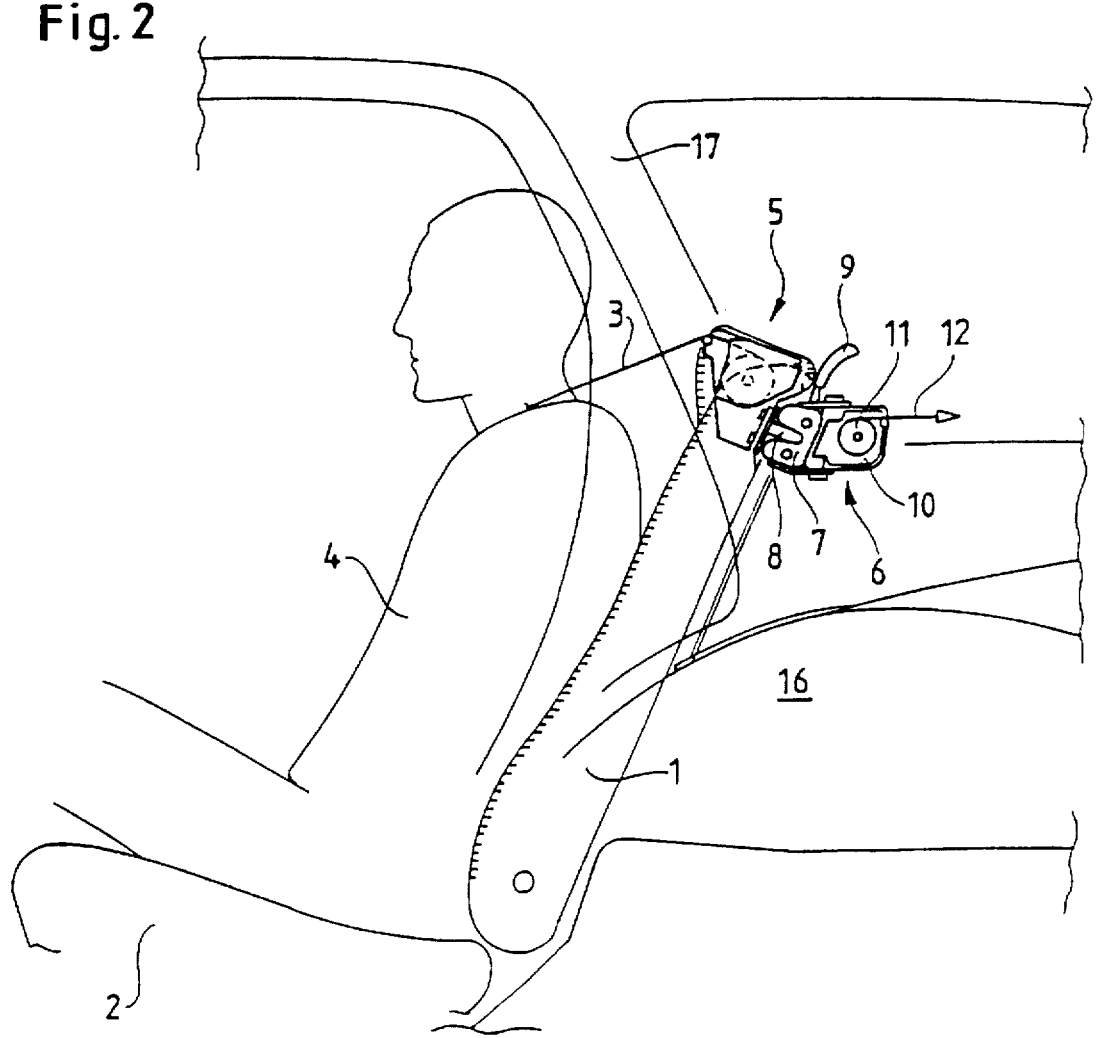
FIG. 2 shows diagrammatically the attachment of a safety belt to a rear seat backrest, and in section, a cross-member having a locking device for locking the cross-member relative to the backrest.
Figure 3:
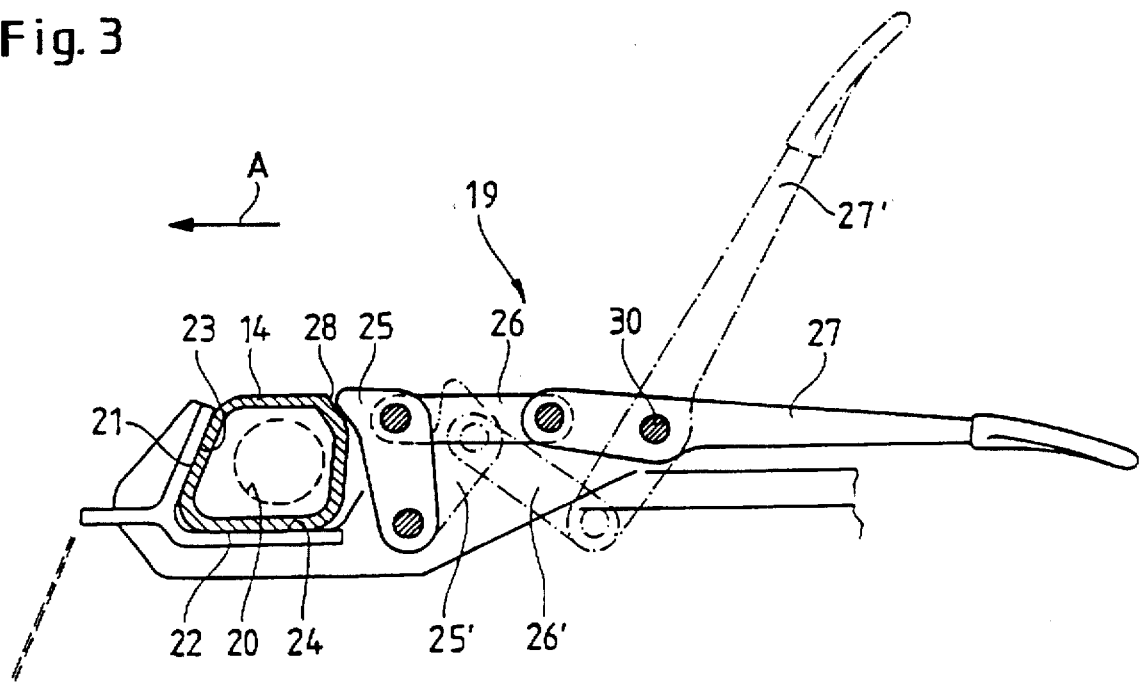
FIG. 3 is a diagrammatic view (partly in section) of a clamping device in the form of a toggle clamp for force-locking connection of the cross-member to the inner body shell.

A safety belt 3 for a middle person 4 seated between two persons seated on the outside includes a retractor 5 which is attached in the upper region of the backrest 1. The backrest 1 is located in position by a cross-member 6 which is connected on the one hand to the backrest and on the other hand releasably to the inner body shell by its end regions. For the releasable connection to the backrest, reclining catches 7 are attached to the cross-member 6 which have openings therein into which respective locking elements 8 firmly attached to the backrest can engage. The locking can be released by operation of a release lever 9. Several reclining catches are provided along the length of the cross-member 6. The cross-member 6 is in the form of a hollow-section body which receives in its interior space 10 a winding shaft 11 for a baggage compartment blind 12 which is led out in the direction of the arrow through a longitudinal slit 13. The winding shaft 10 is mounted in bearings in end-pieces 14 of the cross-member 6. The end-pieces are fitted on the ends of the hollow-section body and are firmly connected thereto. The end-pieces 14 can be connected in force-locking manner to opposed regions 15 of the inner body shell of the vehicle. For this purpose, in the exemplary embodiment shown, respective securing devices, mounted on respective brackets 18, for force-locking connection of the end regions of the cross-member 6 are provided between a rear wheel well indicated by 16 and a C-pillar structure of the vehicle indicated by 17. As shown in FIGS. 1 and 3, the securing device is formed as a clamping device in the form of a toggle clamp 19, the locking position of the toggle clamp being shown in FIGS. 1 and 3 in full lines and the open position in broken lines. The toggle clamp 19 is rigidly connected to the inner body shell of the vehicle through the bracket 18. The cross section of the end-piece 14 of the cross-member 6 can be seen from FIG. 3. The bearing means provided for the winding shaft of the baggage compartment blind is shown diagrammatically by 20. The toggle clamp 19 includes mutually converging seating regions 21 and 22 disposed substantially in the shape of a V for corresponding mutually converging bearing regions 23, 24 of the end-piece 14. The seating regions 21 and 22 and the bearing regions 23 and 24 are respectively formed as seating and bearing faces. When viewed upwardly from below, the flat seating region 21 is obliquely inclined counter to the direction of travel, indicated by A, of the vehicle. The toggle clamp 19 includes a clamping lever 25 which is connected via an elastic coupling 26 to a hand lever 27. The toggle action in the dead region of the linkage thus formed results in the clamping lever 25 exerting a high compressive force against a region 28 of the end-piece 14 of the cross-member 6, so that in this manner a force-locking connection between the cross-member 6 and the opposed regions of the inner body shell is produced. Compensation for tolerances within the lever system can be obtained either through the elastic coupling 26 or through an eccentric pin at the pivot 30. The elements of the toggle clamp in the open position are respectively characterized by the sign "'". Through the force-locking connection of the cross-member, firstly, the backrests 1 are supported against the inner body shell in the direction of travel A of the vehicle; and secondly, a stiff transverse connection within the body structure is produced, whereby vibrations and droning noises are prevented or reduced.

Figure 4:
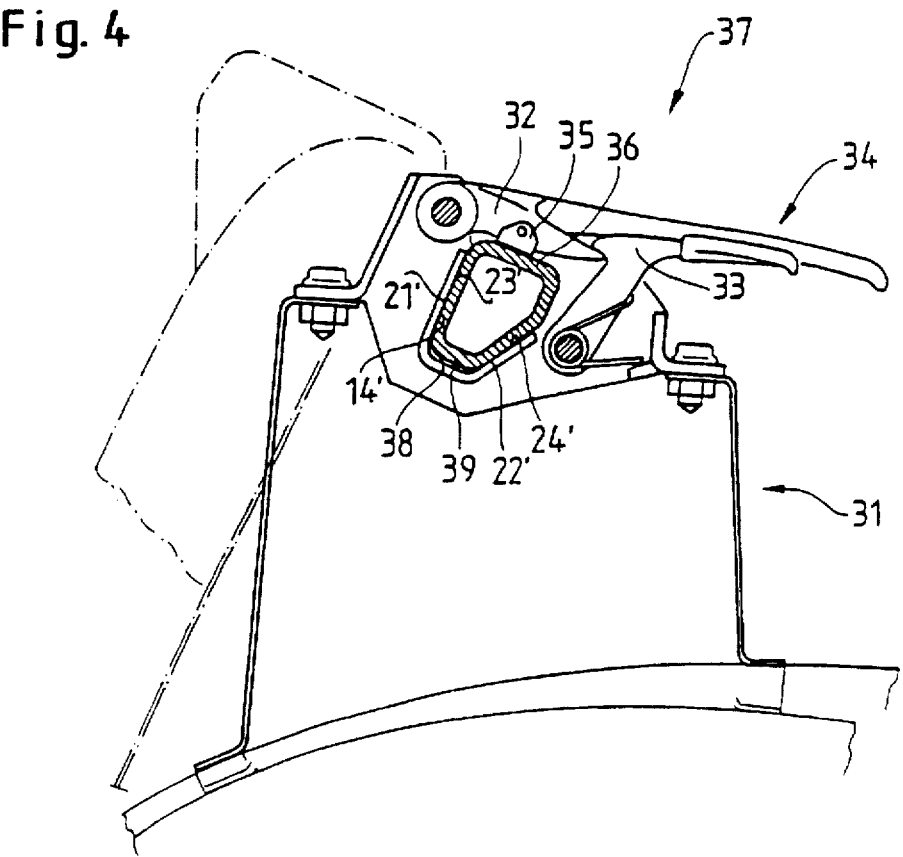
FIG. 4 shows an alternative embodiment of the clamping device with a clamping lever and a detent pawl.

In FIG. 4, a further embodiment of the securing device in the form of a clamping device is illustrated, in which the profile of the end-piece, here designated 14', at an end region of the cross-member 6 has a different form to that shown in FIGS. 1 and 3.

On a bracket attached to the inner body shell and designated generally by 31, there is provided a pivotally attached clamping lever 32, which in the clamping position can be held in position by a detent pawl 33, shown diagrammatically. For compensation of tolerances, an elastic pressure member 35 is provided which bears against an outer region 36 of the end-piece 14'. In addition, the end-piece 14' bears with shaped bearing regions 23' and 24' against corresponding shaped seating regions 21' and 22'. Between these, a further seating region 38 with an associated bearing region 39 is provided.

I claim:

1. A motor vehicle having fold-down backrests on rear seats and having a cross-member which is releasably connectable to the backrests in their upper region and can be releasably attached by its end regions to devices for clamping it in the direction of travel fitted on opposed regions of the inner body shell of the vehicle, wherein the end regions (14) of the cross-member (6), in its attached position, are connected in a force-locking manner by way of the clamping devices (19, 37) to the opposed regions of the inner body shell, the clamping devices having mutually converging seating regions (21, 22 and 21', 22' respectively) for the end regions (14, 14') of the cross-member (6), and the end regions of the cross-member have corresponding mutually converging bearing regions (23, 24 and 23', 24' respectively, converging in the direction of travel.

2. A motor vehicle according to claim 1, wherein the seating regions and the bearing regions are respectively in the form of mutually converging seating and bearing faces converging in the direction of travel.

3. A motor vehicle according to claim 2, wherein one of the seating faces (21, 21') of the securing devices, when viewed upwardly from below, is obliquely inclined counter to the direction of travel (A) of the vehicle.

4. A motor vehicle according to claim 1, wherein the clamping devices (37) comprise clamping levers (32) and detent pawls (33).

5. A motor vehicle according to claim 1, wherein the cross-member (6), at least in its section intermediate the end regions, is in the form of a hollow-section body having a continuous longitudinal slit (13).

6. A motor vehicle according to claim 5, wherein the hollow space (10) of the hollow-section body is shaped to receive a winding shaft (11) for a baggage compartment blind, the free end (12) of which is fed out through the longitudinal slit (13).

7. A motor vehicle according to claim 6, wherein in that the end regions of the cross-member (6) are in the form of end-pieces (14, 14') firmly attached to the ends of the hollow profile body which include mutually conically converging bearing faces (23, 24 or 23', 24' respectively) and also bearings (20) for the winding shaft (11).

8. A motor vehicle according to claim 7, wherein the securing devices (19, 37) are each fitted on a respective bracket (18, 31) between the rear wheel well (16) and the C-pillar structure (17) of the vehicle.

* * * * *